United States Patent
Henn

[11] Patent Number: 4,969,998
[45] Date of Patent: Nov. 13, 1990

[54] COMPOSITE SEMIPERMEABLE MEMBRANE

[75] Inventor: Robert L. Henn, Wilmington, Del.

[73] Assignee: W. L. Gore & Associates, Inc., Newark, Del.

[21] Appl. No.: 603,186

[22] Filed: Apr. 23, 1984

[51] Int. Cl.$^5$ .............................................. B01D 69/12
[52] U.S. Cl. ............................... 210/490; 210/500.36; 264/22
[58] Field of Search ................ 55/16, 158; 210/500.2, 210/490, 491, 500.36; 428/252, 422; 264/22, 49; 427/245, 246

[56] References Cited

U.S. PATENT DOCUMENTS 3,225,107 12/1965 Kirkland et al. ............. 210/500.2 X
4,280,970 7/1981 Kesting ......................... 210/500.2 X Primary Examiner—Frank Spear
Attorney, Agent, or Firm—Mortenson & Uebler

[57] ABSTRACT

A composite semipermeable membrane is provided comprised of:
(a) a flexible film of microporous hydrophobic material having a polar molecule vapor transmission rate in excess of 10,000 gms/m$^2$·24 hours, preferably 100,000 gms/m$^2$·24 hours, and an advancing polar liquid contact angle exceeding 90 degrees, and
(b) a continuous, crosslinked amorphous hydrophilic layer penetrated to an extent into the face of the hydrophobic layer. The hydrophilic layer, when appropriately located in the structure of the microporous hydrophobic material provides a composite membrane having a polar vapor transmission rate of the complete ensemble comparable to or even exceeding that of the hydrophobic material alone, and simultaneously offering two mechanisms of separation; that imposed by the microporous layer and that imposed by the continuous, dense amorphous polymer layer, and as such is capable of numerous separation operations.

31 Claims, 3 Drawing Sheets

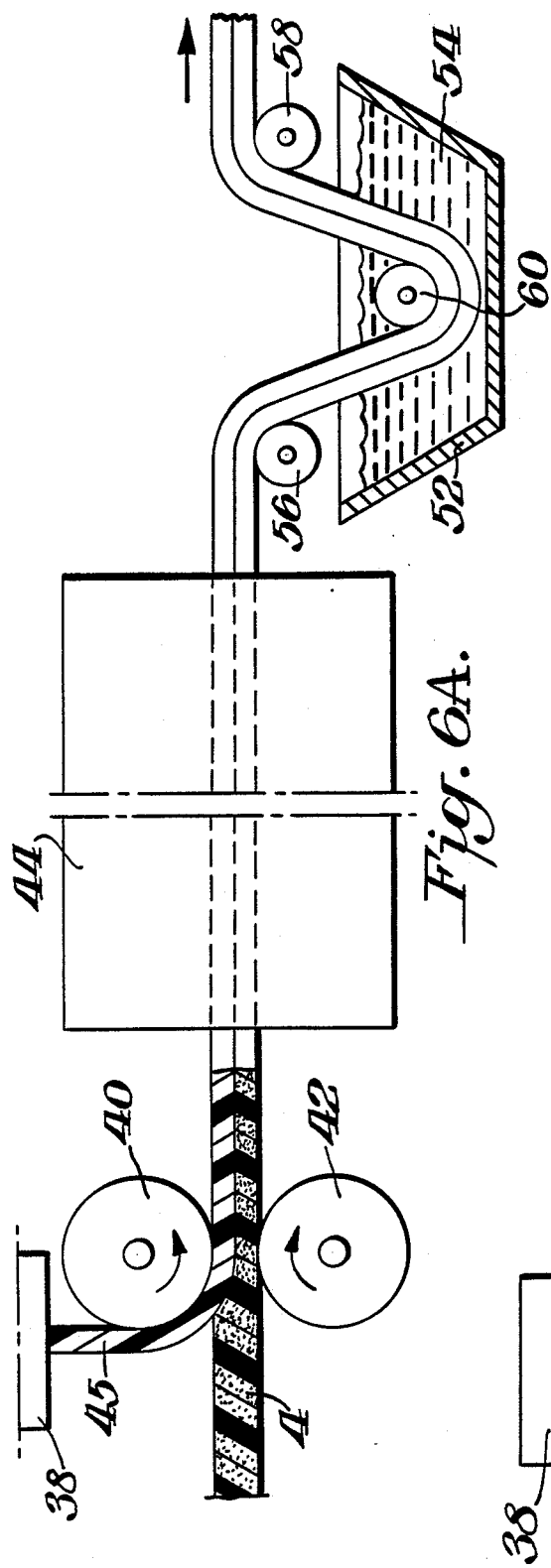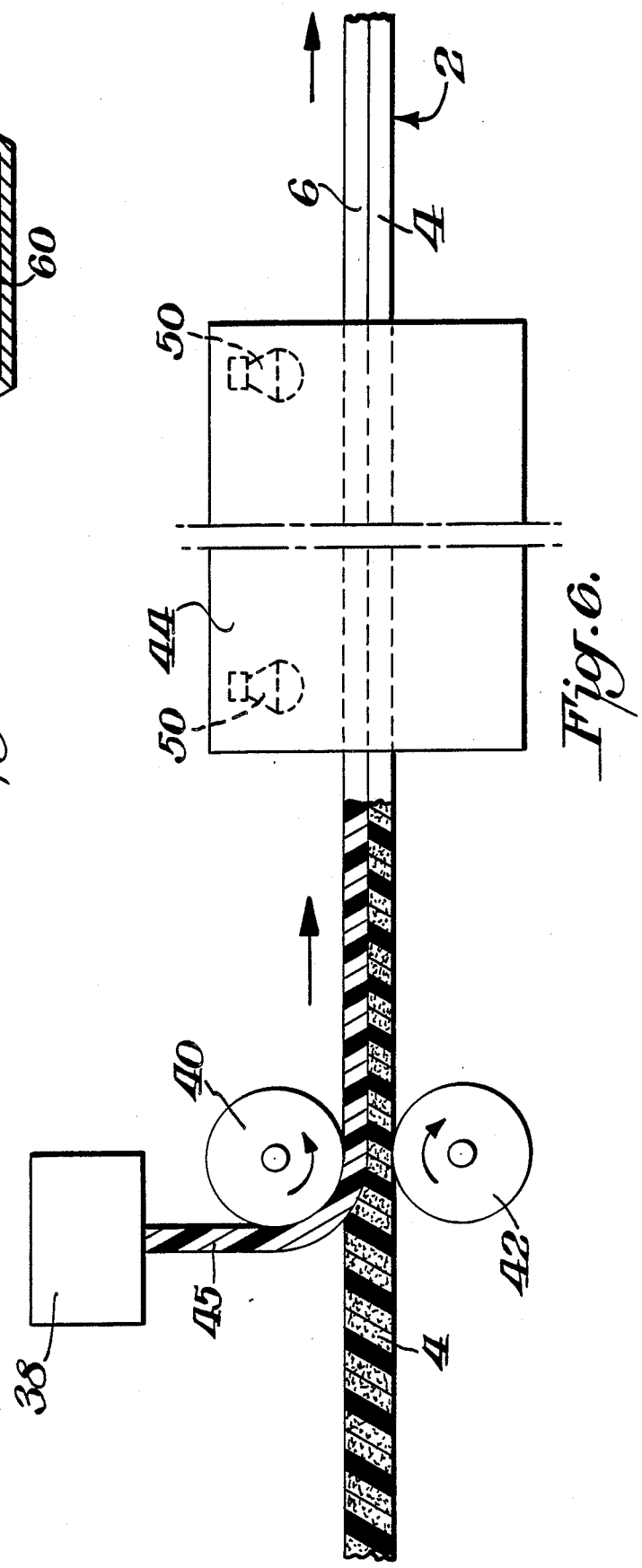

COMPOSITE SEMIPERMEABLE MEMBRANE

BACKGROUND OF THE INVENTION

This invention relates to a semipermeable membrane that offers a high molecular transmission rate selectively to low molecular weight polar molecules while providing excellent resistance to pressure driven liquid flow. The composite membrane is generally useful as a barrier to liquid penetration while simultaneously allowing rapid molecular diffusion of certain polar molecules through the membrane. The high flux of low molecular weight polar molecules afforded by the semipermeable membrane is of value in separation applications where it is desired to concentrate a liquid by removal of low molecular weight polar molecules and/or where removal and/or collection of a low molecular weight species is desired. One particularly suitable use for this composite semipermeable membrane is in the area of rain protective garments.

Protective garments for wear in rain and other wet conditions should keep the wearer dry by preventing the leakage of liquid water into the garment and by allowing perspiration to evaporate as vapour from the wearer to the atmosphere. In the past, and through a long history of rainwear development, certain truly waterproof materials have not allowed the evaporation of perspiration, so that a physically active wearer became sweat-soaked. Materials such as oilskins, polyurethane coated fabrics and poly(vinyl chloride) films are waterproof but do not allow satisfactory evaporation of perspiration.

"Breathable" materials that do permit evaporation of perspiration have tended to allow liquid water penetration from the rain and thus are not truly waterproof. Fabrics treated with silicone, fluorocarbon, and other water repellants usually allow evaporation of perspiration but are only marginally waterproof; they allow water to leak through them under relatively low pressures, and usually leak spontaneously when rubbed or mechanically flexed. Rain garments must withstand the impingement pressure of falling and windblown rain, and the water pressures that are generated in folds and creases in the garment, as well as through other uses generating pressure, such as a pack strap and kneeling or sitting of the wearer.

It is widely recognized that garments should be "breathable" to be comfortable. However, it is not necessary that air pass through the garment for it to be comfortable, only that water from perspiration be transmitted from inside to outside so that undergarments do not become wet and so that the natural evaporative cooling effect can be achieved. The greater ability the material has to transmit water vapour the larger the comfort range of that garment. "Breathability" and the ability to transport interior moisture vapour to the external environment are used interchangeably in this discussion.

The transport of water through a layer can be achieved in numerous ways. Wicking is the most common when large quantities of moisture are to be transferred. Wicking materials ar those that promote the movement of liquid water via capillary action from the interior surface to the exterior surface where it evaporates. They are porous, with interconnecting pores that provide pathways through the wicking material.

Although some wicking materials may resist low pressure flow of liquid water through them due to the tortuousity and the overall length of the flow path, they also readily transport water by capillary action from the exterior surface to the interior surface and therefore prove unsuitable for rain material. The comfort attributed to cotton garments in warm climates results from the ability of such garments to transport water to the exterior surface to readily evaporate and provide cooling. Another natural wicking material, leather, owes its great comfort to breathability via wicking.

U.S. Pat. No. 3,953,566 assigned to the same assignee as the present application, provided porous membranes satisfying the two requirements of being liquid waterproof while also being permeable to the transport of water vapour. For rainwear, these membranes were usually laminated to various textiles for mechanical protection and style. The membranes are inherently hydrophobic and contain very small pores that resist the entry of liquid water even at substantial pressures or when rubbed or flexed, but they readily allow the flow of gases through them, including water vapour. Unlike wicking materials, breathability is achieved by evaporation of liquid water inside the garment or at the inner surface of the membrane followed by gaseous flow or diffusion of water vapour through the membrane's pores to the outside.

However, when such garments were worn during strenuous activities causing the wearer to perspire copiously, surface active agents in perspiration could gradually penetrate the hydrophobic membrane, coat its interior surfaces, thus lowering its apparent surface free energy which caused it to lose its waterproof characteristics and become a wicking material. To restore waterproofness, the garment required cleaning to remove the surface active contaminates. In practice, this was a significant drawback to widespread commercial acceptance of such garments.

Laminated materials which are both waterproof and breathable and which are especially suited for use in rainwear or tents are disclosed in U.S. Pat. No. 4,194,041, assigned to the same assignee as the present application, and specifically incorporated by reference herein. That invention provided a layered article, for use in waterproof garments or tents, that is waterproof, resistant to surface active agents in perspiration, and yet still permits the evaporation of perspiration and the transfer of moisture vapour through the layered article.

That invention comprises a combination of at least two layers: (1) an interior, continuous, hydrophilic layer that readily allows water to diffuse through it, yet prevents the transport of surface active agents and contaminating substances such as those found in perspiration; and (2) a hydrophobic outer layer that resists the flow of liquid water and simultaneously permits the transmission of water vapour therethrough, and also provides thermal insulating properties even when exposed to rain. Garments made of such materials are permanently waterproof from exterior water sources yet allow the evaporation of perspiration whenever the partial pressure of water vapour inside the garment exceeds that outside.

The hydrophilic layer used in the invention of U.S. Pat. No. 4,194,041 has a moisture vapour transmission rate by the test method set forth therein exceeding 1,000 gms/m$^2$· 24 hours, and preferably above about 2,000 gms/m$^2$· 24 hours. It permits no detectable transmission of surface active agents found in perspiration and preferably permits no detectable flow of liquid water at hydrostatic pressures up to 25 psig.

The hydrophobic layer used in that invention has a moisture vapour transmission rate, as measured by the test method set forth in that patent, exceeding 1,000 gms/m$^2 \cdot$ 24 hours and preferably exceeding 2,000 gms/m$^2 \cdot$ 24 hours; an advancing water contact angle exceeding 90° degrees, and is preferably formed of a porous hydrophobic polymer.

However, those skilled in the art have continued to seek semipermeable membranes, for use in rainwear and for other various separations, having a maximized transmission rate of the desired permeant with a simultaneous effective efficiency of separation from undesired species. In some separation practices the transmission rate of the permeant and the efficiency of separation can be tailored not only by the membrane used but also by the condition of the separation. In the area of separation, as applied to the breathable rainwear application where the environment is so variable, it is desirable to have a maximized transmission rate of water over as broad a range of conditions as possible. In general, the material described in U.S. Pat. No. 4,194,041 has a water vapour transmission rate lower than that of the hydrophobic layer alone. It would be desirable to achieve a water vapour transmission rate comparable to the hydrophobic layer utilized alone while still achieving the desired protection of the hydrophobic layer provided by the hydrophilic layer used. The greater the capability of a garment material to transmit water vapour, the greater is the comfort range of that garment. Therefore, to those skilled in the art, there has been a continued effort to maximize the comfort range of a material by maximizing its transmission rate of water vapour throughout all conceivable conditions.

Likewise, those skilled in the art of membrane technologies have engaged in an ongoing, concerted effort to develop satisfactory membranes for commercial separation applications (reference, *Membranes In Separations and as Supports*, Volume 1, Report Text, Business Communications Company, Incorporated, 1983).

In the development of new membranes, the flux of the desired permeant, selective semipermeability, mechanical strength and service life are criteria to be considered. Much of the technology has focused on achieving sufficient flux at economically suitable conditions to make an application commercially viable. In all membrane separations it is necessary to have the semipermeability adjusted so that the flux is not only sufficiently high for the desired permeant, but also that separation efficiency is sufficient to achieve the desired end results. For commercial viability, a membrane having sufficient flux and selectivity must have sufficient strength to be able to be handled and used in actual applications. Also, numerous additional physical and chemical considerations must be considered to provide a membrane with a reasonable service life. It is with these four considerations in mind, as well as the required economic considerations, that those skilled in the art have continued an ongoing effort to develop suitable commercially viable semipermeable membranes and commercially viable processes to produce those membranes to be used in membrane separation technology.

To maximize the flux of the permeant it is desirable to keep the thickness of the membrane to a minimum without compromising continuity. The membrane should have the highest possible diffusivity of the desired permeant through the membrane.

If the desired permeant is water, it would be desirable to improve the solubility of water in the membrane by maximizing the hydrophilic nature of the chemical composition of the material and maximizing the amorphous content of the polymer. Historically, however, it has been difficult to obtain the required mechanical strength in a highly hydrophilic polymeric membrane to allow it to be useful commercially. Specifically, films of a highly hydrophilic polymer have tended to be weak and either easily torn or damaged by abrasion and/or flex or the stresses imposed upon them internally, especially when swollen with water. Accordingly, there is a need to increase the hydrophilicity of these membranes without concomitant deterioration in physical properties.

The requirement for chemical stability must be considered as it relates to service life in addition to the need for sufficient mechanical strength existing in a thin, highly hydrophilic membrane. For instance, with water as the permeant, it is recognized that water will be everywhere present and therefore the polymer must be resistant to hydrolysis to the degree required by the application. It is well-known that ethers offer good resistance to hydrolysis. As well as resistance to the various modes of degradation encountered in a membrane application, it is important that the polymer be non-soluble to the systems encountered, or else service life will be brief. If the polymer is inherently soluble in the system in consideration, for example a highly hydrophilic polymer exposed to an aqueous environment, insolubility may be introduced to the overall system by crosslinking the polymer into an infinite three-dimensional network. The same four considerations that were discussed above must be applied in considering a crosslinked polymer in its entirety. For instance, it is known that crosslinking a polymeric network generally decreases the flux of the desired permeant as crosslink density increases. Conversely, selectivity typically improves. Also, the functional groups involved in crosslinking must be chemically stable to degradation as required by the application (similar to the considerations of the base polymer).

The addition of thiols to olefins to form thioethers is a reaction that is well-known in the art. The thioether functionality affords chemical stability and hydrophilicity in many respects similar to those of its oxygen counterpart. This homolytic addition of the thiyl radical to carbon unsaturation proceeds by a free radical chain transfer mechanism and has been known to be photochemically induced. See, for example, *Mechanism and Structure in Organic Chemistry*, Gould, Edwin S., Henry Holt and Company Incorporated, 1959, pp 741ff, and *Reactions of Organosulfur Compounds*, Block, Eric, Academic Press, Incorporated, 1978, pp 207ff.

This chemical reaction has been reduced to commercial practice as described in U.S. Pat. Nos. 3,662,023, 3,661,744 and 3,708,413, and also as generally described in *Journal of Polymer Sciences,* Polymer Chemistry Edition, Volume 15, Morgan, Magnota and Ketley, 1977, pp 627 to 645. The teachings of the prior art disclose the utility of utilizing the Thiol/Ene chemistry for the curing of polymeric networks by a commercially viable processing technique, specifically as disclosed in U.S. Pat. No. 3,661,744, employing ultraviolet radiation.

U.S. Pat. No. 3,661,744 discloses a photocurable liquid polymer composition including a polyene containing at least two unsaturated carbon-to-carbon bonds at terminal positions having the structure

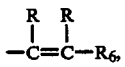

a polythiol component containing two or more pendant or terminally positioned -SH groups, and a photocuring rate accelerator. The patent discloses that the combined functionality of the terminal or pendant -ene and thiol groups must exceed 4 to obtain a solid crosslinked product. The -ene and thiol components are disclosed to be free of reactive internal unsaturation. The patent discloses a process for forming a solid polythioether which comprises admixing the three components recited above as being present in the composition, and then exposing the mixture to actinic light.

U.S. Pat. No. 2,392,294 discloses a photochemical reaction under the influence of ultraviolet radiation to directly form thioethers from (a) hydrocarbons containing terminally unsaturated carbon atoms and (b) aliphatic mercaptans. The unsaturated hydrocarbons may be branched chain, or substituted derivatives thereof, which preferably contain two or more unsaturated linkages of aliphatic character. Included among the specific unsaturated hydrocarbons disclosed are polyolefins and olefin polymers, pentadiene-1,3, pentadiene-1,4, hexadiene-1,5, methylvinyl acetylene, divinyl ether, diallyl ether, dimethallyl ether, allyl alcohol and the like. The patent discloses that it is desirable to have terminal aliphatic unsaturated linkages in the unsaturated organic compound. The preferred polythiol component of this reference comprises dimercaptans of the general formula HS $(CH_2)_n$ SH. The polymethylene dimercaptans are disclosed to be capable of reacting with aliphatic hydrocarbons containing a plurality of unsaturated linkages to produce thioethers having a high molecular weight. Preferred unsaturated organic compounds which may be employed with these dimercaptans include the unsaturated compounds containing unsaturated linkages of aliphatic character in alpha and omega positions (terminal positions). The reference teaches the use of branched chain hydrocarbons or substituted derivatives thereof provided such compounds contain at least one, preferably two or more, unsaturated linkages of aliphatic character and that the most effective wavelengths of light for initiating the desired addition of mercaptans lie in that portion of the spectrum below about 3,200 Angstrom units and more particularly below 2,900 Angstrom units.

U.S. Pat. No. 3,454,539 discloses the reaction of certain polymercaptans with olefin-containing epoxides to produce highly functional polyepoxides. The reference discloses forming polythioepoxides by the reaction of polymercaptan with certain olefin-containing epoxides to improve the properties of the epoxide. This reference teaches that compounds containing more than two active olefin groups are not suitable for practicing the invention because of excessive activity of mercaptan groups with active olefin groups giving in many instances insolubility (crosslinking) without involving the epoxide groups in the reaction.

U.S. Pat. No. 3,466,336 discloses the reaction of acetylenic compounds and $H_2S$ to form polythioethers. The three forms of polythioethers formed by the reaction disclosed include thiol-terminated polythioethers and vinyl-terminated polythioethers. Reactions of the polymers with trifunctional or polyfunctional molecules to form three-dimensional polymer networks are described. Polythioethers having vinyl sulfide end groups (SCH=CHR) can be reacted with tri and/or polythiols. This reference discloses the following reaction:

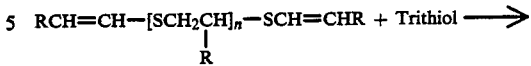

(a three-dimensional polymer network)

*Free Radicals in Solution*, Cheves Walling, John Wiley & Sons, Incorporated (New York) 1967 contains a Section describing three mechanisms for the addition of thiols to olefins, and principally describing a free radical chain reaction to form polymers. The book teaches that peroxides and light will initiate the reaction, and that acetone acts as a photosensitizer and permits light of over 3,000 Angstroms wavelength to act as a photoinitiator. The free radical chain reaction is taught to be useful with virtually any olefin not containing obviously inhibiting functional groups. Polymers from olefins and dithiols, formed, e.g., by the reaction

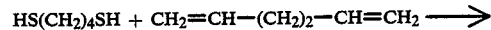

are disclosed to have been studied, with molecular weights of 60,000 being achieved.

U.S. Pat. No. 3,708,413 discloses high energy curable compositions that are curable to provide a solid, self-supporting cured product in the presence of high energy bombardment.

U.S. Pat. No. 3,592,798 discloses the preparation of liquid polythiol products having three or more pendant or terminal groups per molecule that combine with polyfunctional organic reagents such as diacrylates, dimaleates, etc. to form stable, three-dimensional networks. Also disclosed is the basic polyene/polythiol addition reaction which is used to produce a liquid polythioether product. The use of gamma radiation to promote the polyene/polythiol addition reaction is disclosed.

U.S. Pat. No. 3,898,349 discloses a paint vehicle prepared from a composition comprising (1) about 98 to 2 percent by weight of a liquid polyene containing at least two terminal reactive unsaturated carbon-to-carbon bonds per molecule and (2) about 2 to 98 percent by weight of a polythiol containing at least two thiol groups per molecule, the total combined functionality of (a) the reactive unsaturated carbon-to-carbon bonds per molecule in the polyene and (b) the thiol groups per molecule in the polythiol being greater than 4, which composition is curable, preferably under ambient conditions, in the presence of a free radical generator such as electromagnetic radiation of wavelength of about 2,000 to 7,000 Angstroms or high energy ionizing radiation. In instances where the free radical generator is electromagnetic radiation, a curing rate accelerator in an amount ranging from 0.0005 to 50 percent by weight of said composition is added to the polyene/polythiol composition. The resultant vehicle, in pigmented form, can be used per se as a solventless paint or can be used with an inert organic solvent or as a water-soluble or water-dispersible paint.

Commercially available polythiols and polyenes and/or their packages do not meet the needs discussed above for the chemical composition of the desired final hydrophilic film of this invention. Specifically, they are not of a sufficient hydrophilic nature nor are they hydrolytically stable. Commercially available thiols have the thiol functional groups introduced into the desired polymer backbone through known hydrolytically sensitive functional groups such as esters, urethanes and ureas. Likewise, many of the commercial Thiol/Ene systems are used in conjunction with acrylate systems which also have the inherently hydrolytically unstable ester functional group.

SUMMARY OF THE INVENTION

The present invention provides improved semipermeable membranes for use in waterproof materials and in other membrane separation processes. The present invention provides a material having much improved flux of low molecular weight polar molecules and hydrolytic stability, acceptable physical properties, and improved non-yellowing characteristics.

The composite semipermeable membrane of this invention is comprised of:

(a) a flexible film of microporous hydrophobic material having a polar molecule vapour transmission rate in excess of 10,000 gms/m$^2 \cdot$ 24 hours, preferably above 100,000 gms/m$^2 \cdot$ 24 hours, and an advancing polar liquid contact angle exceeding 90 degrees, and (b) a continuous, crosslinked amorphous hydrophilic layer penetrated to an extent into the face of the hydrophobic layer. The hydrophilic layer, when appropriately located in the structure of the microporous hydrophobic material, provides a composite membrane having a polar vapour transmission rate of the complete ensemble comparable to or even exceeding that of the hydrophobic material alone, and having a glass transition temperature well below expected use temperatures and incorporates no hydrolytically sensitive functional groups along its crosslinked polymer backbone.

The composite membrane has sufficient strength which allows for the hydrophilic portion of the membrane to be maximized in its hydrophilicity. With the hydrophilic layer heavily impregnated into the porous hydrophobic layer, the physical properties of the composite, such as tear, flex and abrasion resistance are provided substantially by the porous hydrophobic matrix. While the physical property requirements of the overall membrane are substantially provided by the hydrophobic film layer, the chemical requirements of the semipermeable hydrophilic layer are provided without the compromise normally due physical property considerations.

The invention further provides an essentially odorless solid polyether polythioether, useful as the hydrophilic layer herein, comprised of the free radical chain extended reaction product of:

(a) a terminally unsaturated polyene comprising the formula:

wherein m=0 or 1 and x≧2;

(b) a polythiol component comprising the formula:

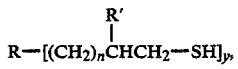

wherein n=0 or 1, R'=H or OH and y≧2;

(c) a free radical initiator; and
(d) a suitable energy source, wherein at least one R is polyoxyethylene having a molecular weight preferably ranging from about 600 to about 1,500 and the other R may be a polyvalent organic moiety free from hydrolytically sensitive functional groups and other carbon-to-carbon unsaturation or thiol functional groups.

Specific examples of alternative R+s, but not limited to, include, an isocyanurate ring, polyoxypropylene, poly(tetramethylene oxide), pentaerythritol, silicate, diethyl ether and glycerol.

An essentially odorless, solid polyether polythioether, specifically useful as the hydrophilic layer herein, is comprised of the free radical chain extended reaction product of:

(a) a terminally unsaturated polyether polyene having a molecular weight preferably ranging from about 600 to about 1,500 comprising the formula:

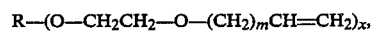

wherein m=0 or 1, R=polyoxyethylene and x≧2;

(b) a polyether polythiol component having a molecular weight preferably ranging from about 600 to about 1,500 comprising the formula:

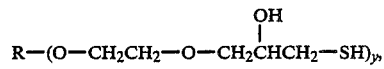

wherein y≧2 and R=polyoxyethylene;

(c) a free radical initiator; and
(d) a suitable energy source.

The free radical addition of the polythiol to the polyene results in a chain extension through hydrolytically stable polythioether functional groups;

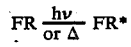

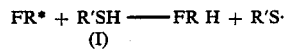

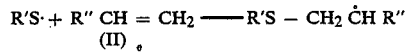

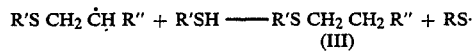

FR is a source for free radicals, such as an aromatic ketone which, when excited, FR*, abstracts a hydrogen radical from the thiol to initiate the chain transfer addition of the polythiol to the polyene. Species I is the polythiol, supra. Species II is the polyene, supra.

Species III is the desired solid polyether polythioether useful in this invention as the hydrophilic layer. This polyether polythioether is a highly hydrophilic, substantially totally amorphous polymer system, hydrolytically stable, insoluble and low-yellowing.

Preferably both R+s are polyoxyethylene but a satisfactory polythioether may also result from the reaction as described wherein the polyene or polythioether component, (but not both) does not contain a polyoxyethylene backbone or other similar hydrophilic functionality, as long as the other component has sufficient hydrophilicity to impart to the hydrophilic layer a minimum hydrophilicity to practice this invention. For example, the hydrophilicity furnished by polyoxyethylene to the overall polymer has been found to be adequate when the polyoxyethylene is in excess of about 43 percent by weight of the polymer, preferably in excess of about 66 percent, and most preferably in excess of about 83 percent.

Suitable non-hydrophilic polyenes would be those that do not compromise other required properties of the final membrane. By way of example, but not limited to, are triallylisocyanurate, pentaerythritol triallylether, butadiene, and -ene terminated polyoxypropylene and poly(tetramethylene oxide).

Suitable non-hydrophilic polythiols would be those that likewise do not compromise other required properties of the final membrane. By way of example, but not limited to, are thiol terminated polyoxypropylene and poly(tetramethylene oxide), pentaerythritol tris ($\alpha$-mercaptopropyl) ether, 2,2'-dimercapto diethyl ether, glycerol bis ($\alpha$-mercaptopropyl) ether, and tris (2-mercaptoethoxy ethyl) isocyanurate, tris (2-mercaptoethyl) isocyanurate.

It is recognized that mercaptans have a characteristic odor that might make the lower molecular weight species commercially undesirable.

Likewise, it is contemplated that any polymeric network wherein polyoxyethylene (or for that matter, any similarly hydrophilic backbone) is in excess of about 43 percent by weight of the final hydrophilic layer, preferably in excess of about 66 percent, and most preferably in excess of about 83 percent, would allow this invention to be practiced. By way of example, but not limited to, is a network formed through the reaction of a polyoxyethylene polythiol and polyoxyethylene polyepoxide, or the photoinitiated cationic polymerization of a similar polyoxyethylene polyepoxide alone.

The invention also provides an actinic-radiation-curable formulation useful for obtaining an essentially odorless solid polyether polythioether. This polyether polythioether is a highly hydrophilic, substantially totally amorphous polymer system, hydrolytically stable, insoluble and low-yellowing. The formulation in reference is comprised of:

(a) a terminally unsaturated polyene comprising the formula:

wherein m=0 or 1 and x≧2;

(b) a polythiol component comprising the formula:

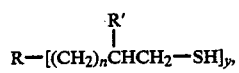

wherein n=0 or 1, R'=H or OH and y≧2; and (c) a free radical initiator, wherein at least one R is polyoxyethylene having a molecular weight preferably ranging from about 600 to about 1,500 and the other R may be a polyvalent moiety free from hydrolytically sensitive functional groups and other carbon-to-carbon unsaturation or thiol functional groups. Alternative suitable R's are as described hereinabove.

A specific actinic-radiation-curable formulation useful for obtaining an essentially odorless solid polyether polythioether according to this invention comprises:

(a) a terminally unsaturated polyether polyene having a molecular weight preferably ranging from about 600 to about 1,500 comprising the formula:

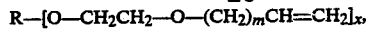

wherein m=0 or 1, x≧2 and R=polyoxyethylene;

(b) a polyether polythiol component having a molecular weight preferably ranging from about 600 to about 1,500 comprising the formula:

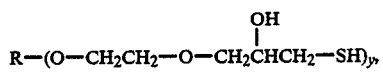

wherein y≧2 and R=polyoxyethylene; and (c) a free radical initiator.

Upon curing, the said formulation results in a cured solid polyether polythioether hydrophilic layer when the sum of x and y is greater than or equal to 4. Crosslinking is effected when the sum of x and y is greater than 4. The higher the sum of x and y, the higher the crosslink density of the hydrophilic polyether polythioether.

The invention also provides a method for forming a flexible composite semipermeable membrane comprising the steps of:

(a) forming a flexible layer of microporous hydrophobic material having a water vapour transmission rate exceeding 10,000 gms/m$^2$· 24 hours and preferably exceeding 100,000 gms/m$^2$· 24 hours and an advancing polar liquid contact angle exceeding 90 degrees, (b) casting the flowable actinic-radiation-curable liquid formulation as described above to form a thin yet continuous layer directly onto the microporous hydrophobic layer, the rheology of the liquid formulation being such that, with sufficient hydraulic pressure applied, affecting controllable penetration of the liquid composition into the microporous hydrophobic layer, (c) followed by a rapid, in situ curing of the hydrophilic layer to form a continuous hydrophilic layer impregnated to an extent into the pores of the microporous hydrophobic film structure and continuously coating at least one face of the hydrophobic layer, the final hydrophilic film being radiation cured through the hydrophilic yet hydrolytically insensitive thioether functionality, the composite membrane hydrophilic layer having a water vapour transmission rate approaching or exceeding that of the hydrophobic layer alone and wherein the cured hydrophilic layer is present within at least one face of the pore structure of the hydrophobic layer, thus mechanically attaching the hydrophilic layer into the hydrophobic layer.

BRIEF DESCRIPTION OF THE DRAWINGS

FIG. 6 depicts the process for making the composite membrane 2, of the present invention.

FIG. 6A shows the process for making the composite membrane wherein the finished composite is washed in a bath of hydrogen peroxide.

Figure 2:
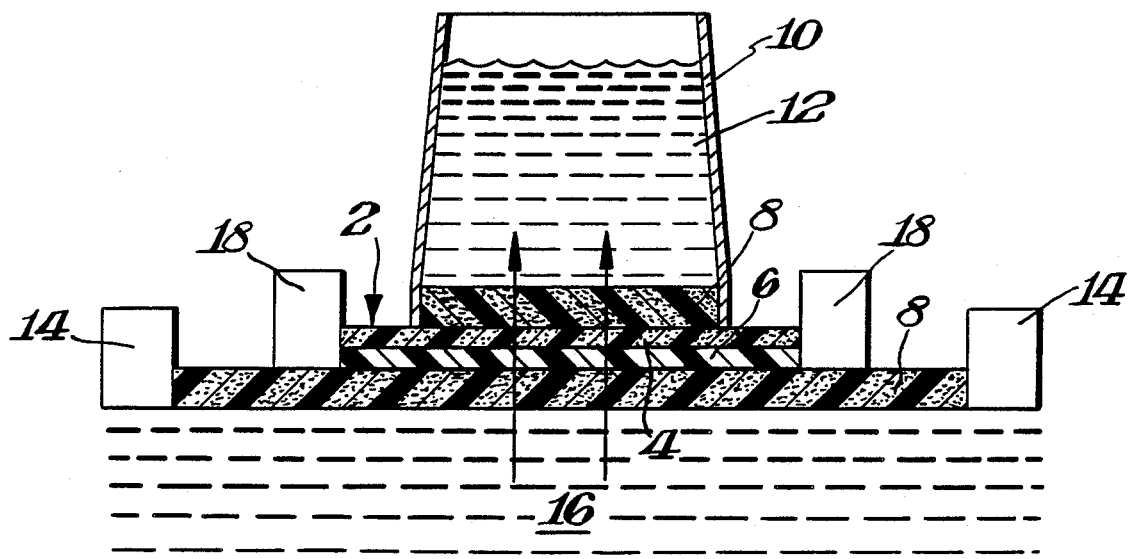
FIG. 2 shows the test configuration for determining the MVTR of a membrane sample wherein the sample 2 is separated from liquid water 16 by a microporous expanded PTFE membrane 8.

DETAILED DESCRIPTION OF THE INVENTION AND PREFERRED EMBODIMENTS WITH REFERENCE TO THE DRAWINGS

In accordance with the invention, a flexible, composite semipermeable membrane is provided comprising a flexible layer of microporous hydrophobic material and a continuous hydrophilic layer penetrated to an extent into at least one face of the porous structure of the hydrophobic layer. When used in rainwear, with an outer textile layer used for aesthetics and providing additional physical characteristics, the hydrophilic layer is generally an inner layer and the hydrophobic layer is oriented exterior to the hydrophilic layer.

For convenience, the following description relates to use of the semipermeable membrane of the present invention for separating water vapour from an aqueous solution as in a rainwear application. Obviously, the semipermeable membrane of the present invention can be used in other applications to selectively separate low molecular weight polar molecules from solutions, such as required in distillation, waste concentration, concentration of citric juices or biological systems or in dialysis application, or wherever it is desired to concentrate a liquid by removal of low molecular weight polar molecules and/or where removal and/or collection of low molecular weight species is desired.

The microporous hydrophobic material has a moisture vapour transmission rate exceeding 10,000 gms/m$^{2\cdot}$ 24 hours, preferably exceeding 100,000 gms/m$^{2\cdot}$ 24 hours and an advancing water contact angle exceeding 90 degrees. The hydrophobic layer readily allows the flow of gases. The microporous hydrophobic layer is flexible and has sufficient physical strength throughout its structure to impart to the overall structure the required mechanical strength. The thickness of the microporous layer must be at least as thick as the desired overall thickness of the final composite membrane. For maximum utility, the microporous material should be thicker than the continuous hydrophilic layer desired; the microporous layer generally has a thickness of from about 10 microns to about 125 microns, preferably from about 25 microns to about 75 microns.

Hydrophobic, as used here, means that water will not spread on the material and wick into its porous structure. A drop of water placed on the surface of a highly hydrophobic layer will remain in the form of a nearly spherical bead with an advancing water contact angle greater than 90 degrees. Water vapour, which evaporates or desorbs from the inner hydrophilic layer, is free to flow or diffuse as a gas through the pores of the hydrophobic layer to the exterior environment.

Where the external relative humidity is 100 percent, as it may be in raining conditions, a vapour pressure differential occurs when the temperature inside the garment is higher than outside, the higher pressure being inside. For this reason, it is desirable to have an insulating layer outside the hydrophilic layer. This steepens the thermal gradient produced by body heat, increases the vapour pressure difference, and thus increases the moisture vapour transmission rate. If the inside surface of the garment is too cool, perspiration vapour will condense on the cool surface and wet the clothing and person within. Further, if the outer covering of a garment is not hydrophobic, it will become wet through by rain, and thus allow the hydrophilic layer to chill, resulting in condensation of perspiration and wetting of the clothing and person within.

It is undesirable for the outer layer to lose most of its thermal insulating properties when it becomes wet with rain. Therefore, the outer layer is preferred to be both hydrophobic and waterproof. It is preferred that this layer be waterproof at water pressures exceeding 172kN/m$^2$ so as to retain its thermal insulating properties and not become wet even when it is subjected to high velocity windblown rain, and/or mechanical flexing and rubbing.

In rainwear applications, usually the interior face of the composite semipermeable membrane is the continuous hydrophilic layer. The hydrophilic layer, when appropriately located within the pores of the microporous hydrophobic material, provides to the composite semipermeable membrane a moisture vapour transmission rate of the complete ensemble which is comparable or exceeds that of the microporous hydrophobic material alone. This high flux of water molecules afforded by the composite membrane is highly surprising and unexpected. This is further significant and valuable when it is considered that an additional separation technology is provided by the composite membrane than that provided by the microporous hydrophobic material alone, yet there is not a concomitant decrease of moisture vapour transmission rate despite the imposition of an additional transport phenomena necessitated by the addition of the hydrophilic layer. For rainwear applications, the hydrophilic layer forms a barrier to passage of surface tension lowering agents such as body oils that would, if present in the hydrophobic layer, tend to reduce the waterproofness of the hydrophobic layer.

The term "hydrophilic" is a relative term and has been used by others in reference to several different characteristics of material, which include the following:

(1) Materials that absorb substantial amounts of water when immersed in it;

(2) Materials that absorb moisture from the atmosphere;

(3) Porous materials that wet through easily when brought in contact with water;

(4) Porous materials that absorb water into their structure when brought in contact with it;

(5) Materials that have surfaces easily wet with water;

(6) Materials that are permeable to water vapour.

As used in reference to this invention, "hydrophilic" denotes a material that rapidly equilibrates with the water vapour pressure to which it is exposed and has a high solubility of water in itself.

The term "hydrophilic layer" used in reference to this invention is restricted to dense, continuous layers of an amorphous polymer, wherein application temperatures are above the glass transition of the polymer. The term "dense" as used in this specification implies that there are no intentional pores of microscopic dimensions in the hydrophilic layer and that all unoccupied volume is simply free space between the segments of the macromolecular chains.

The hydrophilic layer transfers large amounts of water through the film by a diffusion mechanism driven by the partial pressure difference of water vapour across the layer. If a continuous layer of this hydrophilic material is exposed to air containing substantial water vapour on one side of the layer (inside) and to air containing less water vapour on the other side (outside), the side of the layer exposed to the higher water vapour concentration will absorb or solubilize water molecules which will then be transported, via diffusion, through the layer and are then evaporated or desorbed on the side exposed to the lower water vapour concentration. Thus, water vapour is effectively transmitted through the dense hydrophilic film on a molecule by molecule oasis.

The hydrophilic materials of this invention are selective in absorbing and transporting water and other low molecular weight polar molecules, and not surface active agents and other non-polar or high molecular weight polar organic materials generally. Nor do they allow gases such as oxygen, air and nitrogen to flow through them readily under hydrostatic pressure. They are also resistant to hydraulic flow of liquids, including water. These continuous, hydrophilic layers are unique in transporting water by the solution/diffusion mechanism. They do not transfer water by capillary action or by wicking. Water molecules are not believed to be transferred in association with other water molecules but rather as individual molecules. Advantageously, the present invention of a composite hydrophilic film layer and a hydrophobic film layer provides a membrane having a moisture vapour transmission rate of the complete ensemble which is comparable to the porous hydrophobic material alone. Indeed, the composite semi-permeable membrane, in combination with any fabric used as a support, forms a usefully waterproof sheet that possesses a moisture vapour transmission rate that is generally not greatly lower than the moisture vapour transmission rate of the fabric used as the support.

An effective hydrophilic layer has been achieved through the formation of an infinite, three-dimensional polyoxyethylene polythioether network. Hydrophilicity is obtained through the incorporation of hydrophilic functional groups along the network's backbone, specifically:

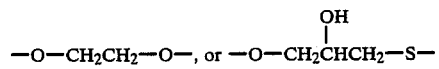

A polythioether network provides for a mechanism wherein the desired hydrophilic functional groups in the backbone may be cured resulting in hydrolytically stable and hydrophilic functional groups.

The preferred polyoxyethylene polythioether network is a free radical chain extended reaction product of a polyoxyethylene polyene and a polyoxyethylene polythiol, the reaction initiated in the presence of UV light via a photoinitiator.

Suitable terminally unsaturated polyene components can be prepared from any of the commercially available polyoxyethylenes and allyl halides or allyl alcohol via the well-known Williamson ether synthesis procedure or any other organic synthesis procedure that yields an allyl ether structure of the formula:

$$R-(O-CH_2CH_2-O-CH_2CH=CH_2)_x,$$

wherein $x \geq 2$ and R=polyoxyethylene; additionally suitable terminally unsaturated polyenes may be those provided by a vinyl ether synthesis route providing a structure of the formula:

$$R-(O-CH_2CH_2-O-CH=CH_2)_x,$$

wherein $x \geq 2$ and R=polyoxyethylene.

A preferred polyene component is the allyl ether of a trifunctional polyoxyethylene of molecular weight approximately, but not limited to, 1,000.

Suitable polythiol components can be prepared by the art discussed in U.S. Pat. No. 3,258,495 and U.S. Pat. No. 3,278,496. The desired polythiols as practiced herein comprise the formula:

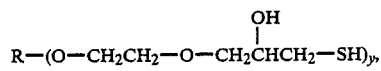

wherein $y \geq 2$ and R=polyoxyethylene.

A preferred polythiol component is the thiol terminated structure depicted above of a trifunctional polyoxyethylene of molecular weight approximately, but not limited to, 1,000.

Suitable photoinitiators are well-known in the art and include, but are not limited to, either independently or in combination; benzophenone, acetophenone(s), dibenzosuberone, 1-hydroxycyclohexylphenyl ketone, benzoin isopropyl ether.

Preferred photoinitiators in this invention are benzophenone and 1-hydroxycyclohexylphenyl ketone.

A preferred source of energy herein is that provided by commercially available ultraviolet light sources.

In order to achieve the desired infinite three-dimensional polyoxyethylene polythioether network, the polyoxyethylene polyene and polyoxyethylene polythiol must have functionalities, when summed, that are greater than 4. In general, it is also preferred to operate with the ratio of polythiol to polyene being approximately 1 to 1 on an equivalency basis.

The amount of photoinitiator used, based on the total weight of the polythiol and polyene combined is from about 0.01 percent to about 10 percent, preferably from 0.5 percent to 2 percent. Of course, as will be obvious to one of ordinary skill in the art, the level of photoinitiator can be varied to vary the rate of reaction, and may also influence final properties.

A microporous, expanded, polytetrafluoroethylene film has been found to be an excellent casting surface upon which a very thin, i.e. about 8 microns and up, coating can be cast of an extremely continuous nature. Penetration into the porous matrix has been achieved in a controllable, industrial manner to provide to the semi-permeable membrane, the flexibility required to achieve the desired flux and separation efficiency, the polytetrafluoroethylene film providing for sufficient strength and other physical properties desired in the composite.

In accordance with the invention, the hydrophilic layer is preferably heavily penetrated into the porous structure of the expanded PTFE hydrophobic layer on one face thereof resulting in mechanical attachment of the hydrophilic layer to the hydrophobic layer upon curing. By thus anchoring the hydrophilic layer to the hydrophobic layer and locating it within the porous structure of the hydrophobic layer, it has been found that the hydrophilicity of the hydrophilic layer can be successfully maximized by adjusting the hydrophilic layer's chemistry without concomitant deterioration in physical properties as required for the application.

Anchoring is accomplished as illustrated in FIG. 6, by dispensing or metering 38, a known amount of the hydrophilic formulation, in flowable liquid form 45, directly onto the flexible microporous hydrophobic layer 4, and then via sufficient hydraulic pressure generally provided by nip rollers 40, 42, the hydrophilic formulation penetrates heavily into the porous structure of the hydrophobic layer to thus impregnate the hydrophilic formulation into one surface of the hydrophobic layer.

The viscosity of the reactive liquid formulation 45 of polyene, polythiol, and photoinitiator at the point of application of the hydraulic pressure is from about 100 cps to 4,000 cps, preferably from about 200 cps to 1,500 cps. Preferably, but not essentially, the formulation is liquid at room temperature.

Figure 5:
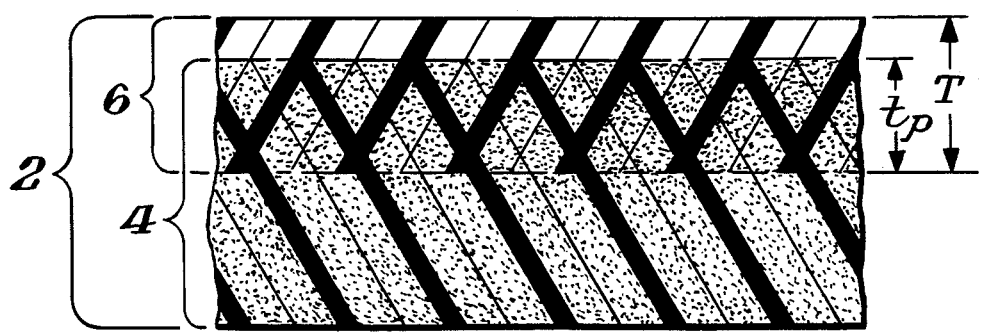
FIG. 5 is a cross sectional view of a composite membrane 2, in accordance with the present invention.

The percentage depth of penetration (dp), FIG. 5, of the hydrophilic layer 6, into the hydrophobic layer 4, is calculated by the ratio of the thickness of penetration (tp) of the hydrophilic layer into the hydrophobic layer to the overall thickness (T) of the hydrophilic layer 6, multiplied by 100, ie., dp=

$$\frac{tp}{T} \times 100.$$

The desired depth of penetration should be in excess of about 75 percent, 100 percent being optimum.

The attachment is secured by curing the continuous impregnated hydrophilic formulation after casting, FIG. 6, preferably by using ultraviolet radiation 44, from a medium pressure mercury lamp by conventional means. Other methods of actinic radiation or those methods that can be used to generate free radicals are feasible, other than radiation that would cause concomitant deterioration of the hydrophobic layer.

Anchoring the hydrophilic layer into the matrix of the hydrophobic layer fulfills the need of the membrane to have physical characteristics required by the application, such as being physically strong, flexible, abrasion resistant and tear resistant. This anchoring allows immense latitude for adjusting the high vapour transmission, dense amorphous polymeric chemistry to provide a maximum flux without the need for addressing compromises in physical characteristics and handling characteristics of the final film.

Without the hydrophilic layer and hydrophobic layer of this invention functioning as a composite, but rather as a "laminate" of the two layers, the results found in the composite structure are not obtainable. A non-penetrated layer of highly hydrophilic material when swollen by water will undergo stresses, crack and disintegrate under use conditions or in some cases, simply exposure to water. A hydrophilic material of adequate physical strength for end-use applications or a "laminate" of the two layers will result in a significant lowering of moisture vapour transfer of the overall membrane versus that of the microporous hydrophobic layer above.

The composite semipermeable membrane produced in accordance with the invention possesses numerous desirable properties. The most evident is the high water vapour transmission rate through a continuous dense film, herein attributable in the preferred hydrophilic layer to a maximization of hydrophilic functional groups, specifically:

—(O—CH$_2$CH$_2$—)$_n$, but also, in the preferred polythioether:

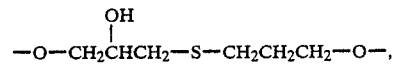

The functionality of the chemistry used herein, for the preferred embodiments of the hydrophilic portion of the semipermeable membrane, is designed to be of a polyether or polythioether nature to be extremely stable chemically, particularly to hydrolysis. Additionally, the preferred semipermeable membrane are non-yellowing and are non-soluble. Also, the maximum hydrophilicity of the final cured hydrophilic layer is achieved by the polymer being locked into a totally amorphous nature by the infinite three-dimensional network formed in the curing reaction, and the base polymer used having a glass transition well below the use temperature of the final composite semipermeable membrane. As used herein, the term amorphous content refers to macromolecules being of a non-crystalline nature having neither definite form nor structure.

The composite semipermeable membrane of this invention can be tailored by the hydrophilic chemistry and the microporous hydrophobic layer to have the required flux and the required separation efficiency. As is well-known in the art, crosslink density of a continuous dense amorphous polymer network will effect these characteristics. The higher the crosslink density, generally, the lower the moisture vapour transmission rate and the greater the separation ability. Within the scope of the present invention, it is believed that these parameters are controlled not only by the crosslink on a molecular level but also on the microscopic level by the porous structure of the hydrophobic layer. The tighter and smaller the pore structure, the less swelling of the hydrophilic layer with concomitant decrease in moisture vapour transmission rate and increase in separation ability.

For convenience and clarity, this discussion was limited to the separation of water vapour from an aqueous solution, as in a rainwear type application. It should be noted, however, that the hydrophilic layer will transport rapidly molecules of sufficiently low molecular weight and capable of offering a hydrogen for hydrogen-bonding, such as, but not limited to, alcohols, hydrogen sulphide, mercaptans, carboxylic acids, inorganic acids, chloroform and aldehydes. In addition, the composite membrane offers two mechanisms of separation: that imposed by the microporous layer and that imposed by the continuous dense amorphous polymer layer, and as such is capable of numerous separation operations as mentioned, flux can be achieved in either direction through the composite membrane thus inverting the order of separation as most desired by the application.

It is contemplated that the practice of this invention can use other microporous hydrophobic structures such as those made from, but not limited to, coagulation, stretching, foaming, etching, phase-separation; of poly(vinyl chloride), polyurethane, polypropylene, polycarbonate, polystyrene, polyethylene, polyamide, or any process and polymer that results in the hydrophobic requirements as discussed herein. Expanded, microporous polytetrafluoroethylene is preferred.

Likewise, it is further contemplated that the practice of this invention can use other hydrophilic materials that meet the requirement herein such as, but not limited to, poly(vinyl alcohol), homopolymer and copolymers of methacrylic and acrylic acids, polyacrylamides, poly(vinyl pyridone), poly(n-vinyl pyrrolidones), poly(maleic anhydride).

The following examples will illustrate the present invention and include the best mode presently known of carrying it out. It should be emphasized, however, that the examples given herein, are purely illustrative in character and this invention is not to be limited to the details set out therein since variations in said details are possible without departing from the scope or spirit of the invention as will be obvious to those skilled in this art.

A description of the tests employed to measure moisture vapour transmission rate (MVTR) follow. There are four basic methods employed to measure MVTR herein: two ASTM procedures and two other procedures as described below. The variations in the test methods simulate different service conditions and provide a broader basis for understanding the benefits of the composite semipermeable membrane of this invention. Agreement should not be assumed between the various methods.

1. WET MODIFIED DESICCANT METHOD (MOM)

Figure 1:
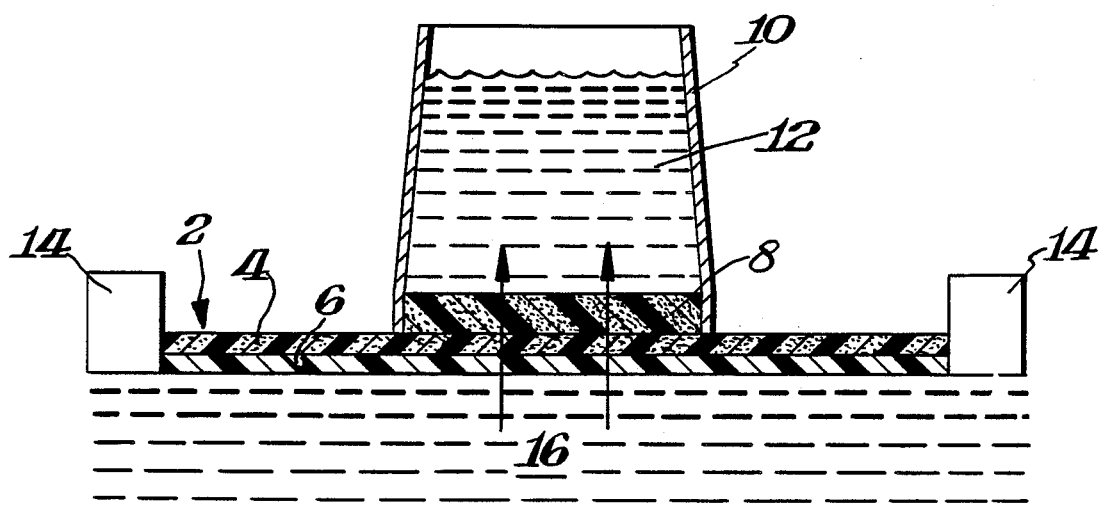
FIG. 1 shows the test configuration for determining the moisture vapour transmission rate (MVTR) of a sample composite membrane wherein the sample 2, is in direct contact with liquid water 16.

The test apparatus for determining MVTR according to the procedure described herein, as the wet MDM method, is shown in FIG. 1. This method is appropriate for waterproof materials that are to be in contact with liquid water. The MVTR values set forth in all claims herein below are values determined by this method.

In the procedure, approximately 70 ml of a saturated salt solution of potassium acetate and distilled water 12 is placed into a 4.5 ounce polypropylene cup 10, having an inside diameter of 6.5 cm at the mouth. An expanded PTFE membrane 8, having a Gurley number of 5.5 seconds, a bubble point of 26.8 psig, thickness of 25 micrometers and a weight of 12 gms per square meter, available from W. L. Gore & Associates, Incorporated, Elkton, Md., product designation PN 10300NA, is heat sealed to the lip of the cup to create a taught, leakproof, microporous barrier containing the salt solution. The membrane 2, to be tested, is placed taught within a six inch diameter embroidery hoop 14, and floated upon the surface of the water 16, with the hydrophilic face 6, in direct contact with the water. The water bath assembly is jacketed for temperature control and provides movement of the test water via gentle stirring. A controlled environment for the cup assembly is accomplished via an enclosed headspace above the water of the bath. The entire apparatus is controlled at 23° C.±0.1° C., utilizing a temperature controlled room and a water circulating bath. After allowing the membrane to equilibrate with the water for 15 minutes, the cup assembly is weighed to the nearest 1/1,000 gm and placed in an inverted manner on the center of the floating sample, as shown in FIG. 1.

Water transport is provided by the driving force between the water 16, and the saturated solution providing water flux by diffusion in the direction as indicated by the arrows in FIG. 1. The sample is tested for 15 minutes and then the cup assembly is removed and weighed again to within 1/1,000 gm.

The MVTR of the sample is calculated from the weight gain of the cup assembly and is expressed in gms of water per square meter of sample surface area per 24 hours.

2. DRY MODIFIED DESICCANT METHOD (MDM)

The test apparatus for determining MVTR according to the procedure described herein, termed the dry MDM method, is shown in FIG. 2. This method provides a high relative humidity in contact with the sample without direct liquid contact with the composite membrane.

The procedure is similar to the wet MDM method and utilizes the same cup assembly as described previously. An expanded PTFE membrane 8, product designation PN 10300NA, as characterized above, is mounted taught in a six inch embroidery hoop 14, and floated upon the surface of the water 16. The composite membrane 2 is mounted taught in a three inch diameter embroidery hoop 18, with the hydrophilic face 6 oriented down on the surface of the floating PTFE membrane.

The test is conducted and the MVTR calculated according to the weight gain of the cup assembly as described in the wet MDM method.

3. ASTM EW 96-80BW INVERTED WATER METHOD

Figure 3:
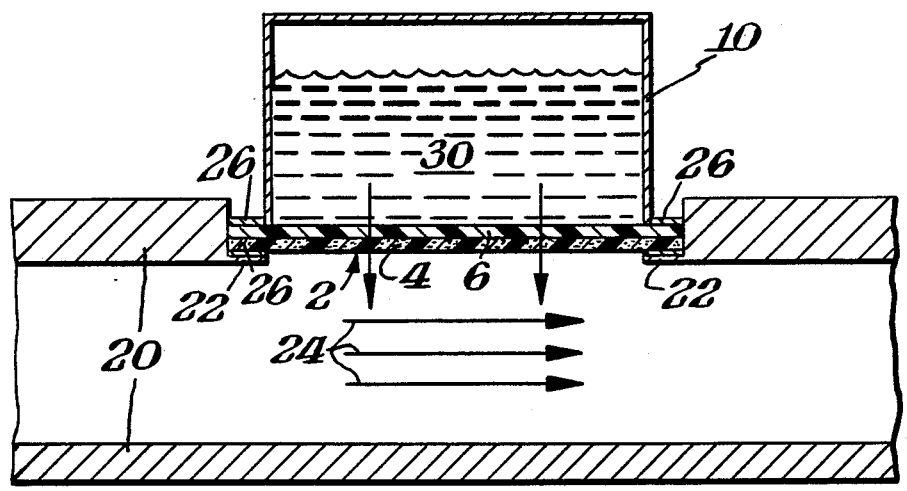
FIG. 3 shows the test configuration for determining the MVTR of a membrane sample 2 as described in ASTM-E96-80B.

FIG. 3 shows the test assembly for determing MVTR according to the procedure referred to hereafter as the inverted water method, and discussed in detail under ASTM for Water Transmission of Materials, ASTM EW 96-80BW.

The sample is secured with clamp 26 into a Thwing-Albert Vapometer Cup 10, manufactured for this test method and previously filled to a height of one inch of distilled water 30, having the hydrophilic face 6 mounted forward the inside of the cup. The entire cup assembly is then weighed to the nearest 1/100 gm, inverted, and placed onto the lip 22 of the opening provided for the cup in the Controlled Air Flow Water Vapour Test Chamber 20, available from W. L. Gore & Associates, Incorporated, identified above.

The chamber 20 provides a free stream air velocity 24 of 550 FPM±50 FPM, measured two inches from the sample and at least two inches from any other surface in the channel. The entire chamber is located in a room environmentally controlled to 23° C.±1° C. and 50 percent±2 percent, relative humidity, providing a driving force in the direction as indicated. The sample is tested for two hours after which the cup assembly is removed and weighed again to within 1/100 gm.

The MVTR of the sample is calculated from the weight loss of the cup assembly and is expressed in gms of water per square meter of sample surface area per 24 hours.

4. ASTM EW 96-80B UPRIGHT WATER METHOD

Figure 4:
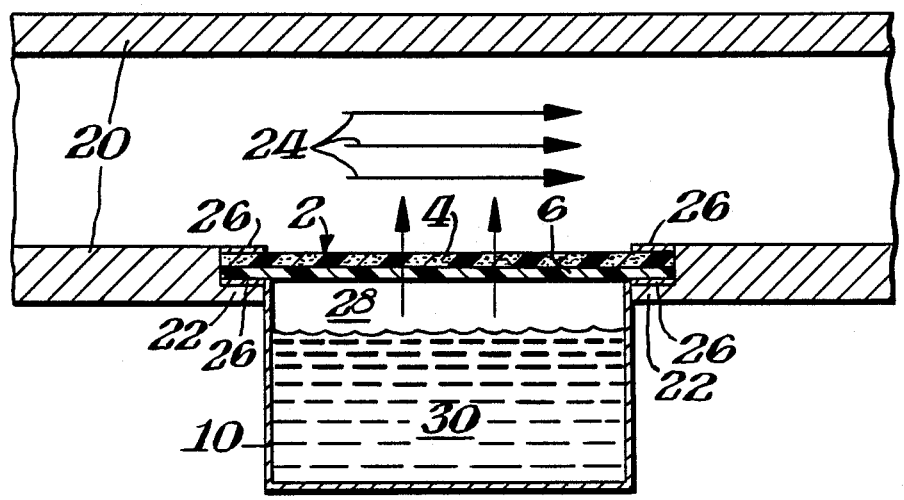
FIG. 4 shows the test configuration for determining the MVTR of a membrane sample 2 as described in ASTM-E96-80BW.

FIG. 4 shows the test assembly for determining MVTR according to the procedure referred to herein as the upright water method, and discussed in detail under the ASTM for Water Transmission of Materials, ASTM EW 96-80B.

The sample 2, is mounted similarly as in the inverted water method wherein the cup 10 has been filled with distilled water 30 to provide a 0.75 inch air gap 28 between the surface of the water 30 and the composite sample 2. The cup assembly is weighed to the nearest 1/100 gm and placed upright onto the lip 22, of the Controlled Air Flow Test Chamber 20, similar to that described earlier. Transfer of water vapour through the sample is in the direction indicated in FIG. 4, and, in this configuration, is limited by the stagnant air gap, 28, to an estimated MVTR upper limit of 1,000 gms/m$^2$ 24 hours. The sample is tested for 24 hours, the cup assembly removed and weighed again to within 1/100 gm. The MVTR is calculated from the weight loss of the cup assembly and is expressed in gms of water per square meter of sample surface area per 24 hours.

Generally, a method of making the composite membrane of this invention is as shown in FIG. 6 wherein the liquid formulation 45 which will form the hydrophilic layer of the composite, comprising the specified polyene and polythiol, together with the photoinitiator, is metered from the dispenser 38 (which may be a gravure roller) onto the surface of rubber roll 40 and thence carried to the surface of the hydrophobic porous solid layer 4, moving in the direction of the arrows as shown, to form a liquid layer of desired thickness thereon. Hydraulic pressure generated between the nip rollers 40 and 42 forces this liquid into the pores of the hydrophobic layer 4. The hydrophobic membrane 4 with the liquid formulation 45 penetrated therein is then conveyed through housing 44 and the surface having the liquid formulation thereon is exposed to radiation by lamps 50 to effect curing of the liquid formulation to a solid, continuous hydrophilic layer. The composite membrane 2 thus formed is characterized by a solid hydrophilic layer 6 having thickness (T) and penetrated into hydrophobic layer 4 to a thickness of penetration (tp), shown in detail in FIG. 5. FIG. 6A shows the finished composite 2 preferably guided through a bath 54 of 3 percent $H_2O_2$ in water to substantially eliminate certain residual odors, followed by drying by conventional means, not shown.

EXAMPLE 1

Synthesis of a polyene was accomplished by a Williamson ether route. The reaction was effected in a one liter, four-neck, water jacketed reaction kettle, equipped with a stirrer, nitrogen purge, condenser, addition funnel and thermocouple. 46.8 gms (1.17 equivalents) of technical grade flaked NaOH was charged to the reaction kettle, followed by the complete addition of 300 gms (0.90 equivalents) of a polyoxyethylene, having an average functionality of 3 and a molecular weight of approximately 1,000.

The entire reaction assembly was purged briefly with nitrogen and then the reagents stirred and allowed to react for one hour at approximately room temperature. To the thus formed sodium alkoxide was added, via the addition funnel, 89.5 gms (1.17 equivalents) of allyl chloride, while maintaining the reaction temperature less than 28° C. by controlling the addition rate of the allyl chloride and cooling of the jacketed kettle. After addition of the allyl chloride was effected, the reaction was stirred for 17 hours, maintaining the temperature below 28° C. and a nitrogen blanket throughout.

Purification was effected by vacuum stripping the allyl chloride from the reaction kettle, decanting the polyene product from the settled solids and subsequent filtration to remove the remaining solids. The polyene product was analyzed by $C^{13}$ NMR and found to have 96 percent conversion of the polyol hydroxy functionality to allyl ether and a viscosity of about 85 cps at 25° C.

The polyene thus formed is hereinafter referred to as Polyene A, and is the preferred polyene herein.

EXAMPLE 2

A reaction similar to Example 1, employing a polyoxyethylene of an approximate molecular weight 600, and a functionality of 2, yielded a 97 percent converted polyene, having a viscosity of about 49 cps at 25° C. and hereinafter referred to as Polyene B.

EXAMPLE 3

A polyoxyethylene polythiol was obtained from Diamond Shamrock Corporation made according to the teachings of U.S. Pat. No. 3,258,495 and U.S. Pat. No. 3,278,496 from the same polyoxyethylene of Example 1. The polythiol was analyzed by $C^{13}$ NMR and found to have 86 percent conversion of the polyol hydroxy functionality to mercaptan functionality. The polythiol thus obtained had a viscosity of about 1034 cps at 25° C. and is hereinafter referred to as Polythiol C, and is the preferred polythiol.

EXAMPLE 4

A polythiol was obtained from the same polyoxyethylene utilized in Example 2, by the manner described in Example 3. The polythiol was 70 percent converted, had a viscosity of about 6450 cps at 25° C. and is hereinafter referred to as Polythiol D.

EXAMPLE 5

6.1 gms (2 percent) benzophenone was heated to 50° C. and then added warm to 152 gms of Polyene A and 151 gms of Polythiol C at room temperature. The entire solution was stirred and was found to have a viscosity of about 258 cps at 25° C. and is hereinafter referred to as Formulation E.

EXAMPLE 6

Equal amounts of benzophenone and 1-hydroxycyclohexylphenyl ketone were added to a glass beaker, heated and stirred to effect solution. 11.4 gms of this mixture were then added to 285 gms of Polyene A and 284 gms of Polythiol C. The entire solution was stirred, was found to have a viscosity of about 269 cps at 25° C. and is hereinafter referred to as Formulation F, and is the preferred curable formulation.

EXAMPLE 7

11.0 gms of the 50 percent mixture of benzophenone and 1-cyclohexylphenyl ketone were added to 285 gms of Polyene A and 264 gms of Polythiol D similarly to Example 6. This mixture, having a viscosity of about 343 cps at 25° C., is hereinafter referred to as Formulation G.

EXAMPLE 8

10.1 gms of the 50 percent mixture of benzophenone and 1-cyclohexylphenyl ketone were added to 83 gms of triallyl isocyanurate and 420 gms of Polythiol C. This mixture, having a viscosity of about 677 cps at 25° C., is hereinafter referred to as Formulation H. The polyene in Formulation H is not hydrophilic.

EXAMPLE 9

8.7 gms of the 50 percent mixture of benzophenone and 1-cyclohexylphenyl ketone was added to 83 gms of triallyl isocyanurate and 352 gms of Polythiol D. This mixture, having a viscosity of about 415 cps at 25° C., is hereinafter referred to as Formulation I.

EXAMPLE 10A 10.8 gms of the 50 percent mixture of benzophenone and 1-cyclohexylphenyl ketone was added to 255 gms of Polyene B and 284 gms of Polythiol C. This mixture, having a viscosity of about 213 cps at 25° C., is hereinafter referred to as Formulation J.

EXAMPLE 10B 8.7 gms of the 50 percent mixture of benzophenone and 1-cyclohexylphenyl ketone was added to 255 gms of Polyene B and 264 gms of Polythiol D. This mixture, having a viscosity of about 222 cps at 25° C., is hereinafter referred to as Formulation K.

EXAMPLE 11

Formulation F was metered onto a Thiokol rubber roll by the use of a gravure roll to effect a continuous liquid layer of the desired amount. Hydraulic pressure generated between the rubber roll and a backing roll was adjusted to drive the formulation into the matrix of an expanded PTFE membrane, commercially available from W. L. Gore & Associates, Incorporated, product designation PN 11124NA, having a Gurley number of 4.8 seconds, a bubble point of 23.5 psig, thickness of 37.5 micrometers width of 1.67 m and a weight of 15.8 gms/m$^2$. The membrane with the formulation penetrated into it's structure was then conveyored at 30 FPM through two banks of medium pressure mercury vapour lamps, 300 watts per linear inch UV lamps to effect curing of the liquid formulation to a solid, continuous hydrophilic layer. The composite membrane thus formed was characterized by Scanning Electron Microscopy to have a hydrophilic layer of 9.5 micrometers thickness (T) and 9.5 micrometers thickness of penetration (tp), as shown in FIG. 5.

EXAMPLE 12

The composite membrane of Example 11 was tested for MVTR by the 4 methods earlier described and compared to the hydrophilic layer alone and the layered article prepared according to the teachings of U.S. Pat. No. 4,194,041.

| MVTR | Expanded PTFE PN 11124NA | Layered Article of U.S. Pat. No. 4,194,041 | Composite Semipermeable Membrane |
|---|---|---|---|
| WET MDM (MVTR, as claimed) | 127,356 | 62,997 | 154,359 |
| DRY MDM | 91,512 | 20,613 | 62,665 |
| UPRIGHT WATER METHOD | 1,023 | 799 | 971 |
| INVERTED WATER METHOD | 12,086 | 12,125 | 13,846 |

EXAMPLE 13

Formulations E, G, H, I, J and K were processed in a manner similar to Example 11 with the expanded PTFE membrane, PN 11124NA similar to Example 11 having a Gurley number of 4.8 seconds, a bubble point of 21.1 psig, thickness of 50 micrometers and a weight of 18.9 gms/m$^2$ and a 122,975 gms/m$^2$ 24 hours wet MDM MVTR. These composite semipermeable membranes were characterized as follows:

| Formulation | E | G | H | I | J | K |
|---|---|---|---|---|---|---|
| (T) | 14.5 | 17.3 | 15.4 | 20.4 | 18.2 | 30.0 |
| (tp) | 14.5 | 17.3 | 15.4 | 20.4 | 18.2 | 30.0 |
| WET MDM (MVTR, as claimed) | 162,853 | 167,842 | 118,921 | 181,085 | 177,535 | 185,737 |
| DRY MDM | 50,760 | 53,985 | 27,571 | 37,278 | 47,736 | 70,028 |

EXAMPLE 14

Formulation F was processed according to the manner of Example 11 with an expanded PTFE membrane, product designation CH224-211, having a Gurley number of 4.4 seconds, a bubble point of 24.5 psig, thickness of 47.5 micrometers, width of 1.67 m, a weight of 18.9 gms/m$^2$ and a wet MDM of 119,832 gms/m$^2$ 24 hours. The composite membrane herein was characterized by Scanning Electron Microscopy to have a hydrophilic layer of 17.3 micrometers thickness (T) and 17.3 micrometers thickness of penetration (tp) and having a wet MDM of 173,622 gms/m$^2$·24 hours.

EXAMPLE 15

Formulation F was processed according to the manner of Example 11 with expanded unsintered PTFE membrane PN 11316NA, having a Gurley number of 350 seconds, a bubble point of 47 psig, thickness of $1.0 \times 10^5$ micrometers, width of 0.44 m, a weight of 77.7 gms/m$^2$ and a wet MDM of 26,993 gms/m$^2$·24 hours. The composite membrane herein wa characterized by Scanning Electron Microscopy to have a hydrophilic layer of 25.0 micrometers thickness (T) and 22.7 micrometers thickness of penetration (tp) and having a wet MDM of 30,479 gms/m$^2$ 24 hours.

EXAMPLE 16

Formulation F was processed according to the manner of Example 11 with expanded PTFE membrane PN 10300NA, having a Gurley number of 4.6 seconds, a bubble point of 25.3 psig, thickness of 23.8 micrometers, width of 1.67 m and a weight of 12.0 gms/m$^2$ and a wet MDM of 152,351 gms/m$^2$· 24 hours. The composite membrane herein was characterized by Scanning 8lectron Microscopy to have a hydrophilic layer of 14.5 micrometers thickness (T) and 14.5 micrometers thickness of penetration (tp) and having a wet MDM of 193,708 gms/m$^2$· 24 hours.

EXAMPLE 17

A three layer laminate was made consisting of a composite membrane prepared in a manner similar to Example 6. The composite membrane herein was characterized by SEM to have a hydrophilic layer of approximately 13 micrometers thickness (T) and approximately 13 micrometers thickness of penetration (tp) and having a Wet MDM of 113,323 gms/m$^2$· 24 hours. The composite membrane was sandwiched between an outer woven shell fabric of approximately 2.8 ounces per yard nylon Taslite and an inner knit tricot of approximately 1.5 ounces per yard. The layers were bonded together by an adhesive applied in a dot pattern so as not to occlude more than half of the membrane surface area of either side. The shell side of the laminate was then treated with a water repellant.

A six inch square sample of this laminate was then sewn into the back of two T-shirts. Each T-shirt was worn over a period of five days, for a total of approximately five hours of jogging to subject it to perspiration. The T-shirts were worn by two persons known to previously experience loss of waterproofness due to contamination after one half hour to one hour of like jogging conditions using a laminate containing a layer of microporous PTFE alone.

After each one hour of perspiration exposure, the samples were tested for leakage by a hydrostatic water head of 30 inches for three minutes, as specified in FED-STD-191, Method 5516. Both samples subjected to this test were found to not leak, indicating the hydrophobic layer had not been contaminated. Likewise, the hydrophobic layer had remained white and opaque, whereas if contaminated, it would be expected to look clarified. The test was discontinued after about five hours of exposure.

EXAMPLE 18

In an effort to test the MVTR of the hydrophilic layer independent from the composite structure of this invention, a film of Formulation F, approximately 250 micrometers thick was hand cast onto polyester film. The formulation was then cured upon exposure to a non-focused UV light source of 100 watts for approximately two minutes. In an effort to remove the slightly adhered cured hydrophilic layer from the polyester, the hydrophilic layer was moistened with water. As the hydrophilic layer swelled instantly, stresses were introduced that caused the hydrophilic film to crack and literally disintegrate immediately into innumerable pieces.

EXAMPLE 19

Six laminates were made at the same time in like manner to the laminate made described in Example 17, however, without the water repellant applied.

The different laminates were both two-layer (i.e. without knit) and three-layer (i.e. with knit) Antron laminates of the hydrophilic layer alone, the layered article prepared according to the teachings of U.S. Pat. No. 4,194,041 and the composite membrane of this invention. The composite membrane was characterized by SEM to have a hydrophilic layer of 12.7 micrometers thickness (T) and 8.2 micrometers of thickness of penetration (tp) and a Wet MDM of 108,057. These laminates are summarized in the table. The laminates were tested for MVTR by the four methods earlier described.

of 10,000 gms/m$^2 \cdot$ 24 hours, and an advancing polar liquid contact angle exceeding 90 degrees, and (b) a continuous, hydrophilic layer penetrated to an extent into the face of said hydrophobic layer and physically attached thereto, said composite membrane having a transmission rate of a polar vapour exceeding 80 percent that of said material alone, wherein said hydrophobic layer is an essentially odorless solid polyether polythioether comprised of the free radical chain extended reaction product of:

(a) a terminally unsaturated polyene comprising the formula:

$$R-[(CH_2)_m CH=CH_2]_x,$$

wherein m=O or 1 and x≧2;

(b) a polythiol component comprising the formula:

$$R-[(CH_2)_n \overset{R'}{\underset{|}{C}}HCH_2-SH]_y,$$

wherein N=O or 1, R'=H or OH and y≧2;

(c) a free radical initiator; and (d) a suitable energy source, wherein at least one R is polyoxyethylene and the other R may be polyoxyethylene or a polyvalent organic moiety free from hydrolytically sensitive functional groups and other carbon-to-carbon unsaturation or thiol functional groups.

2. A flexible, layered composite semipermeable membrane comprising:

(a) a flexible film of a microporous material having a polar molecular vapour transmission rate in excess of 10,000 gms/m$^2 \cdot$ 24 hours, and an advancing polar liquid contact angle exceeding 90 degrees, and (b) a continuous, hydrophilic layer penetrated to an extent into the face of said hydrophobic layer and physically attached thereto, said composite membrane having a transmission rate of a polar vapour exceeding 80 percent that of said material alone, wherein said hydrophilic layer is an essentially odorless solid polyether polythioether, comprised of the free radical chain extended reaction product

| LAMINATE: | L | M | N | O | P | Q |
|---|---|---|---|---|---|---|
| SHELL FABRIC: | ←1.7 ounces per yard Antron Knit→ | | | | | |
| MEMBRANE: | Expanded PTFE PN 11124NA | | Layered Article of U.S. Pat. No. 4,194,041 | | Composite Semipermeable Membrane | |
| KNIT: | Two-layer | Three-layer | Two-layer | Three-layer | Two-layer | Three-layer |
| MVTR TEST* | | | | | | |
| WET MDM | 34,920 | 24,114 | 29,858 | 17,445 | 34,943 | 35,530 |
| DRY MDM | 29,376 | 14,178 | 15,911 | 5,779 | 27,074 | 13,455 |
| UPRIGHT WATER METHOD | 1,258 | 1,206 | 867 | 732 | 1,159 | 1,027 |
| INVERTED WATER METHOD | 6,552 | 6,102 | 7,353 | 4,537 | 7,921 | 8,155 |

*Units: gms/m$^2 \cdot$ 24 hours

What is claimed is:

1. A flexible, layered composite semipermeable membrane comprising:

(a) a flexible film of a microporous material having a polar molecular vapour transmission rate in excess of:

(a) a terminally unsaturated polyether polyene comprising the formula:

$$R-[O-CH_2CH_2-O-(CH_2)_m CH=CH_2]_x,$$

wherein m=O or 1 and x≧2;

(b) a polyether polythiol component comprising the formula:

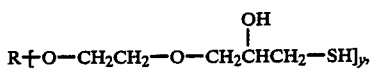

wherein $y \geq 2$;
(c) a free radical initiator; and
(d) a suitable energy source,
wherein R is polyoxyethylene.

3. The composite membrane of claim 1 wherein said polyoxyethylene has a molecular weight ranging from 600 to 1,500.

4. The composite membrane of claim 2 wherein said polyoxyethylene has a molecular weight ranging from 600 to 1,500.

5. The composite membrane of claim 1 wherein both R's are polyoxyethylene.

6. The composite membrane of claim 1 wherein said other R is selected from the group consisting of an isocyanurate ring, polyoxypropylene, poly(tetramethylene oxide), pentaerythritol, silicate, diethyl ether and glycerol.

7. The composite membrane of claim 1 or 2 wherein said hydrophilic layer contains at least 40 percent by weight polyoxyethylene.

8. The composite membrane of claim 7 wherein said hydrophilic layer contains at least 60 percent by weight polyoxyethylene.

9. The composite membrane of claim 8 wherein said hydrophilic layer contains at least 80 percent by weight polyoxyethylene.

10. The composite membrane of claim 1 or 2 wherein said hydrophilic layer is impermeable to air.

11. The composite membrane of claim 1 or 2 having at least one additional textile layer affixed to at least one surface thereof and in laminate attachment thereto.

12. A synthetic polymer comprising an essentially odorless solid polyether polythioether comprised of the free radical chain extended reaction product of:
(a) a terminally unsaturated polyene comprising the formula:

wherein $m = 0$ or 1 and $x \geq 2$;
(b) a polythiol component comprising the formula:

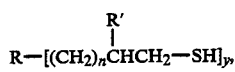

wherein $n = 0$ or 1, $R' = H$ or OH and $y \geq 2$;
(c) a free radical photoinitiator; and
(d) a suitable energy source,
wherein at least one R is polyoxyethylene and the other R may be polyoxyethylene or a polyvalent organic moiety free from hydrolytically sensitive functional groups and other carbon-to-carbon unsaturation or thiol functional groups.

13. A synthetic polymer comprising an essentially odorless solid polyether polythioether, comprised of the free radical chain extended reaction product of:
(a) a terminally unsaturated polyether polyene comprising the formula:

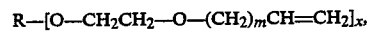

wherein $m = 0$ or 1 and $x \geq 2$;
(b) a polyether polythiol component comprising the formula:

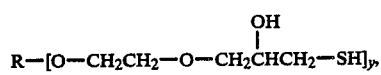

wherein $y \geq 2$;
(c) a free radical photoinitiator; and
(d) a suitable energy source, wherein R is polyoxyethylene.

14. The polymer of claim 12 wherein said polyoxyethylene has a molecular weight ranging from 600 to 1,500.

15. The polymer of claim 13 wherein said polyoxyethylene has a molecular weight ranging from 600 to 1,500.

16. The polymer of claim 12 or 13 said photoinitiator is selected from the class consisting of benzophenone, acetophenone(s), dibenzosuberone, 1-hydroxycyclohexylphenyl ketone, benzoin isopropyl ether.

17. The polymer of claim 12 or 13 wherein said photoinitiator is a combination of benzophenone and 1-hydroxycyclohyexylphenyl ketone.

18. The polymer of claim 12 wherein both R's are polyoxyethylene.

19. The polymer of claim 12 wherein said other R is selected from the group consisting of an isocyanurate ring, polyoxypropylene, poly(tetramethylene oxide), pentaerythritol, silicate, diethyl ether and glycerol.

20. A photocurable chemical formulation comprising (a) a terminally unsaturated polyene component comprising the formula:

(a) a terminally unsaturated polyene component comprising the formula:

wherein $m = 0$ or 1 and $x \geq 2$;
(b) a polythiol component comprising the formula:

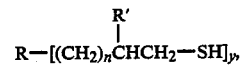

wherein $n = 0$ or 1, $R' = H$ or OH and $y \geq 2$; and
(c) a free radical initiator; wherein at least one R is polyoxyethylene and the other R may be polyoxyethylene or a polyvalent moiety free from hydrolytically sensitive functional groups and other carbon-to-carbon unsaturation or thiol functional groups.

21. The photocurable chemical formulation of claim 20 wherein said other R is selected from the group consisting of an isocyanurate ring, polyoxypropylene, poly(tetramethylene oxide), pentaerythritol, silicate, diethyl ether and glycerol.

22. The photocurable chemical formulation of claim 20 wherein said polyoxyethylene has a molecular weight ranging from 600 to 1500.

23. The photocurable chemical formulation of claim 20 wherein both R's are polyoxyethylene.

24. A photocurable chemical formulation comprising (a) a terminally unsaturated polyether polyene component comprising the formula:

$$R-[O-CH_2CH_2-O-(CH_2)_mCH=CH_2]_x,$$

wherein m=0 or 1, R =polyoxyethylene and x≧2;

(b) a polyether polythiol component comprising the formula:

$$R-[O-CH_2CH_2-O-CH_2\overset{OH}{\underset{|}{C}}HCH_2-SH]_y$$

wherein y≧2 and R=polyoxyethylene; and
(c) a free radical initiator.

25. The photocurable chemical formulation of claim 24 wherein said polyoxyethylene has a molecular weight ranging from 600 to 1,500.

26. The photocurable chemical formulation of claim 20 or 24 wherein said photoinitiator is selected from the class consisting of benzophenone, acetophenone(s), dibenzosuberone, 1-hydroxycyclohexylphenyl ketone, benzoin isopropyl ether.

27. The photocurable chemical formulation of claim 20 or 24 wherein said photoinitiator is a combination of benzophenone and 1-hydroxycyclohexylphenyl ketone.

28. A method for forming a flexible, layered composite semipermeable membrane comprising the steps of:

(a) forming a flexible layer of a microporous hydrophobic material having a water vapour transmission rate exceeding 10,000 gms/m²·24 hours and an advancing polar liquid contact angle exceeding 90 degrees, (b) casting a flowable liquid formulation comprising:
 (1) a terminally unsaturated polyene component comprising the formula:

$$R-[(CH_2)_mCH=CH_2]_x,$$

wherein m=0 or 1 and x≧2;
 (2) a polythiol component comprising the formula:

$$R-[(CH_2)_n\overset{R'}{\underset{|}{C}}HCH_2-SH]_y,$$

wherein n=0 or 1, R'=H or OH and y≧2; and
 (3) a free radical initiator; wherein at least one R is polyoxyethylene and the other R may be a polyoxyethylene or a polyvalent moiety free from hydrolytically sensitive functional groups and other carbon-to-carbon unsaturation or thiol functional groups,
 to form a continuous layer directly onto said microporous hydrophobic layer, the rheology of said liquid being such that, with sufficient hydraulic pressure applied, controllable penetration of said liquid into the microporous hydrophobic layer is achieved, (c) applying said hydraulic pressure
(d) followed by curing of said liquid to form a continuous solid polymeric hydrophilic layer impregnated to an extent into the pores of said microporous hydrophobic layer, said composite membrane having a water vapour transmission rate exceeding 80 percent that of said hydrophobic layer alone.

29. A method for forming a flexible, layered composite semipermeable membrane comprising the steps of:

(a) forming a flexible layer of a microporous hydrophobic material having a water vapour transmission rate exceeding 10,000 gms/m²·24 hours and an advancing polar liquid contact angle exceeding 90 degrees, (b) casting a flowable liquid formulation comprising:
 (1) a terminally unsaturated polyether polyene comprising the formula:

$$R-[O-CH_2CH_2-O-(CH_2)_mCH=CH_2]_x,$$

wherein m=0 or 1, R=polyoxyethylene and x≧2;
 (2) a polyether polythiol component comprising the formula:

$$R-[O-CH_2CH_2-O-CH_2\overset{OH}{\underset{|}{C}}HCH_2-SH]_y$$

wherein y≧2 and R=polyoxyethylene; and
 (3) a free radical initiator, to form a continuous layer directly onto said microporous hydrophobic layer, the rheology of said liquid being such that, with sufficient hydraulic pressure applied, controllable penetration of said liquid into the microporous hydrophobic layer is achieved, (c) applying said hydraulic pressure
(d) followed by curing of said liquid to form a continuous solid polymeric hydrophilic layer impregnated to an extent into the pores of said microporous hydrophobic layer, said composite membrane having a water vapour transmission rate exceeding 80 percent that of said hydrophobic layer alone.

30. The method of claim 28 or 29 wherein said hydrophobic layer is selected from the class consisting of microporous polytetrafluoroethylene, polypropylene, poly(vinyl chloride), polyurethane, polycarbonate, polystyrene, polyethylene and polyamide.

31. The method of claim 28 or 29 wherein said hydrophobic layer is expanded, microporous polytetrafluoroethylene.

* * * * *